(12) United States Patent
Casey et al.

(10) Patent No.: US 12,241,793 B2
(45) Date of Patent: Mar. 4, 2025

(54) ELECTRONICALLY READABLE COLORIMETRIC SENSOR

(71) Applicant: Acelorex, Inc., Penfield, NY (US)

(72) Inventors: Brendan Casey, Webster, NY (US); Michael Leo, Penfield, NY (US); George Gibson, Fairport, NY (US)

(73) Assignee: Acelorex, Inc., Penfield, NY (US)

( * ) Notice: Subject to any disclaimer, the term of this patent is extended or adjusted under 35 U.S.C. 154(b) by 655 days.

(21) Appl. No.: 17/511,722

(22) Filed: Oct. 27, 2021

(65) Prior Publication Data

US 2022/0113201 A1 Apr. 14, 2022

Related U.S. Application Data (63) Continuation of application No. PCT/US2020/031272, filed on May 4, 2020.
(Continued)

(51) Int. Cl.
  *G01K 11/12* (2021.01)
  *G01H 9/00* (2006.01)
  (Continued)

(52) U.S. Cl.
  CPC ............. *G01K 11/12* (2013.01); *G01H 9/00* (2013.01); *G01N 21/80* (2013.01); *H04W 4/38* (2018.02); *H04W 4/80* (2018.02)

(58) Field of Classification Search
  CPC .. H04W 4/38; H04W 4/80; G01N 2021/0118; G01N 21/78; G01N 21/80; G01N 2021/7773; G01N 2021/7793; G01N 21/31; G01N 21/3151; G01N 21/55; G01N 21/7703; G01N 21/783; G01N 2201/0231;
(Continued)

(56) References Cited

U.S. PATENT DOCUMENTS

| 5,610,393 A | * | 3/1997 | Klimcak | ............ G01N 21/7703 250/227.14 |
| 6,336,362 B1 | * | 1/2002 | Duenas | ................. G01F 15/063 73/313 |

(Continued)

FOREIGN PATENT DOCUMENTS

| JP | 2003102024 | 4/2003 |
| WO | 2018223090 | 12/2018 |

OTHER PUBLICATIONS

International Search Report and Written Opinion for PCT/US2020/031272 (Aug. 12, 2020) Aug. 12, 2020.
(Continued)

*Primary Examiner* — Dionne Pendleton
(74) *Attorney, Agent, or Firm* — Michael J. Nickerson (57) ABSTRACT

A colorimetric based sensor system includes a low power communication system to harvest energy from an interrogator and to broadcast information to the interrogator; a controller operatively connected to the low power communication system; a light emitter, operatively connected to the controller, to emit light; a light detector, operatively connected to the controller, to convert receive light into electrical signals; and a colorimetric based sensor, having a changeable color patch and in optical communication with the light detector and the light emitter, to measure a condition of an object of interest.

20 Claims, 3 Drawing Sheets

Related U.S. Application Data (60) Provisional application No. 62/857,324, filed on Jun. 5, 2019.

(51) Int. Cl.
  G01N 21/80 (2006.01)
  H04W 4/38 (2018.01)
  H04W 4/80 (2018.01)

(58) Field of Classification Search
  CPC ..... G01N 2201/062; G01N 2201/1211; G01N 2600/00; G01N 33/542; G01N 33/54373; G01N 33/84; G01H 9/00; G01D 5/30; G01K 1/02; G01K 11/12; G01K 3/04; A61B 5/0075; A61B 2560/0223; A61B 2562/02; A61B 5/0008; A61B 5/01; A61B 5/021; A61B 5/02416; A61B 5/0816; A61B 5/082; A61B 5/0836; A61B 5/097; A61B 5/1032; A61B 5/14532; A61B 5/14546; A61B 5/14553; A61B 5/4064; A61B 5/412; A61B 5/4836; A61B 5/486; A61B 5/6803; A61B 5/6821; A61B 5/7405; A61B 5/7415; A61B 5/746; A61M 16/0051; A61M 16/024; A61M 2021/0027; A61M 2021/0088; A61M 21/02; A61M 2205/3303; A61M 2205/581; A61M 2205/582; A61M 2230/432; B60H 1/00742; B60K 28/06; B60T 7/14; B60W 2040/0818; B60W 2540/221; B60W 2540/26; C12M 1/22; C12M 23/22; C12M 23/24; C12M 23/44; C12M 23/50; C12M 37/04; C12M 41/14; C12M 41/36; G01F 15/063; G01F 15/0755; G01F 23/366; G06F 17/18; G06F 3/147; G16H 20/30; G16H 20/40; G16H 40/40; G16H 40/63; G16H 40/67; G16H 50/20; H04M 1/72412
  See application file for complete search history.

(56) References Cited

U.S. PATENT DOCUMENTS

| | | | |
|---|---|---|---|
| 2012/0214252 A1* | 8/2012 | Knop | G01N 33/542 436/164 |
| 2015/0094914 A1* | 4/2015 | Abreu | B60H 1/00742 701/1 |
| 2016/0245830 A1* | 8/2016 | Mace | G16H 50/20 |
| 2018/0320122 A1* | 11/2018 | Blanchard | C12M 23/50 |
| 2018/0335440 A1 | 11/2018 | Mace et al. | |

OTHER PUBLICATIONS

English Transaltion of Published Japanese Patent Application JP2003102024 2020.
Preliminary Report on Patentability for PCT/US2020/031272 (Dec. 16, 2021) Dec. 16, 2021.

* cited by examiner

ELECTRONICALLY READABLE COLORIMETRIC SENSOR

PRIORITY INFORMATION

The present application is a continuation application of PCT Patent Application Number PCT/US2020/031272, filed on May 4, 2020, and claims priority, under 35 U.S.C. § 120, from PCT/US2020/031272, filed on May 4, 2020. The entire content of PCT/US2020/031272, filed on May 4, 2020, is hereby incorporated by reference.

PCT/US2020/031272, filed on May 4, 2020, claims priority, under 35 U.S.C. § 119(e), from U.S. Provisional Patent Application, Ser. No. 62/857,324, filed on Jun. 5, 2019. The entire content of U.S. Provisional Patent Application, Ser. No. 62/857,324, filed on Jun. 5, 2019, is hereby incorporated by reference.

BACKGROUND

Conventional colorimetric sensors can be used to measure/communicate properties or states of environments. For example, a colorimetric sensor can be used to assess the instant pH of a system or environment using a number of well-known indicator dyes, which change colors in response to the pH of the system or environment. The indicator dyes can be used directly or immobilized by, for instance, applying them to a highly absorptive material; such as Hydrion® papers or strips Additionally, a colorimetric sensor can be immersed in the material of interest. For example, in food and/or pharmaceutical applications, it is conventional to expose the colorimetric sensor to the headspace gas around the material of interest. A pH sensitive containing label, in contact with the headspace in packaged protein-based foods can detect the emergence of amine containing volatiles which signal spoilage. More sophisticated colorimetric indicating materials have been developed which might change color in the presence of the products of microbial metabolism, or of chemical vapors which might pose safety hazards.

Moreover, conventional colorimetric sensors can be used to measure temperature. These colorimetric sensors can be reversible and irreversible.

For example, conventional reversible thermochromic sensors display a color representative of the current temperature of the environment and that color changes back and forth as the temperature cycles.

On the other hand, conventional irreversible temperature sensors change color when some threshold temperature is reached. Subsequent heating or cooling does not cause the color to revert. Conventional irreversible temperature sensors are useful in detecting, for instance, cold chain integrity.

In situations where momentary temperature excursions are not consequential but prolonged exposure to inappropriate temperature is consequential due to spoilage or other processes detrimental to product quality, conventional time temperature sensors have been utilized. In a conventional time temperature sensor, the color change is dependent no only on the temperature sensed but on the amount of time that the time temperature sensor was exposed to that temperature.

Furthermore, conventional colorimetric sensors have been used to measure chemical conditions, the presence or absence of a material such as a poison gas and/or liquid, and/or shock applied to or mis-orientation of an object.

When utilizing conventional colorimetric sensors, a user must be able to physically observe the color change. Additionally, when utilizing a conventional colorimetric sensor, the lighting conditions under which the observation is made plays a factor in gathering the correct information because the lighting conditions may distort the perceived color. While such colorimetric sensors are often quire inexpensive, the requirement for undistorted line-of-site prevents their application in many common situations.

To address the line-of-sight issue, conventional electronic sensors have been used.

For example, temperature can be accurately measured, for instance, by a bimetallic thermocouple. The thermocouple may include circuitry to measure the output of the thermocouple, as well as, store the temperature data with a corresponding time stamp. To collect the temperature data, a communication device, such as a radio frequency identification device, a near field communication device, or a Bluetooth™ low energy device. In summary, the conventional electronic temperature sensor would include a power source, circuitry to measure the output of the thermocouple, a clock, a processor, memory, and a communications device.

As noted above, a radio frequency identification device can be used to communicate information without requiring a line-of-sight. A radio frequency identification device system is composed of two components: a transponder and an interrogator. The interrogator transmits a signal which is received by the transponder. The signal is used to interrogate the transponder so as to retrieve desired data therefrom. The transponder is comprised of an antenna and a microchip. The microchip has a number of functions included, but not limited to, conditioning any signal emitted by the interrogator, decoding information contained within that signal, and rebroadcasting encoded information back to the interrogator.

In the simplest form of a radio frequency identification device, the power required for operation of the microchip and rebroadcast encoded information back to the interrogator is derived from the signal broadcast by the interrogator. Such radio frequency identification devices are passive.

In other embodiments, especially where detection is required to take place quickly or over long distances, the radio frequency identification device may have contained therein a battery or other active power source. Such radio frequency identification devices are semi-passive or active depending on the details of the power platform.

An example of a passive radio frequency identification device is disclosed in U.S. Pat. No. 7,474,230. The entire content of U.S. Pat. No. 7,474,230 is hereby incorporated by reference.

Another example of a passive radio frequency identification device is disclosed in U.S. Pat. No. 8,240,911. The entire content of U.S. Pat. No. 8,240,911 is hereby incorporated by reference.

An example of the utilization of multiple radio frequency identification devices is disclosed in U.S. Pat. No. 8,596,544. The entire content of U.S. Pat. No. 8,596,544 is hereby incorporated by reference.

In the various conventional systems and devices disclosed above, the conventional systems and devices fail to provide a colorimetric based sensor that can be read in a non-line-of-sight situation.

Moreover, the conventional systems and devices fail to provide a colorimetric based sensor that is not sensitive to light conditions that can distort the perceived color.

Furthermore, the conventional systems and devices fail to provide a colorimetric based sensor that can be read in a non-line-of-sight situation and is not sensitive to light conditions that can distort the perceived color.

Therefore, it is desirable to provide a colorimetric based sensor system that can be "read and communicated" to an interrogator in a non-line-of-sight situation.

Also, it is desirable to provide a colorimetric based sensor system that is not sensitive to light conditions that can distort the perceived color.

Additionally, it is desirable to provide a colorimetric based sensor system that can be "read and communicated" to an interrogator in a non-line-of-sight situation and is not sensitive to light conditions that can distort the perceived color.

BRIEF DESCRIPTION OF THE DRAWING

The drawings are only for purposes of illustrating various embodiments and are not to be construed as limiting, wherein.

DETAILED DESCRIPTION OF THE DRAWING

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

Figure 1:
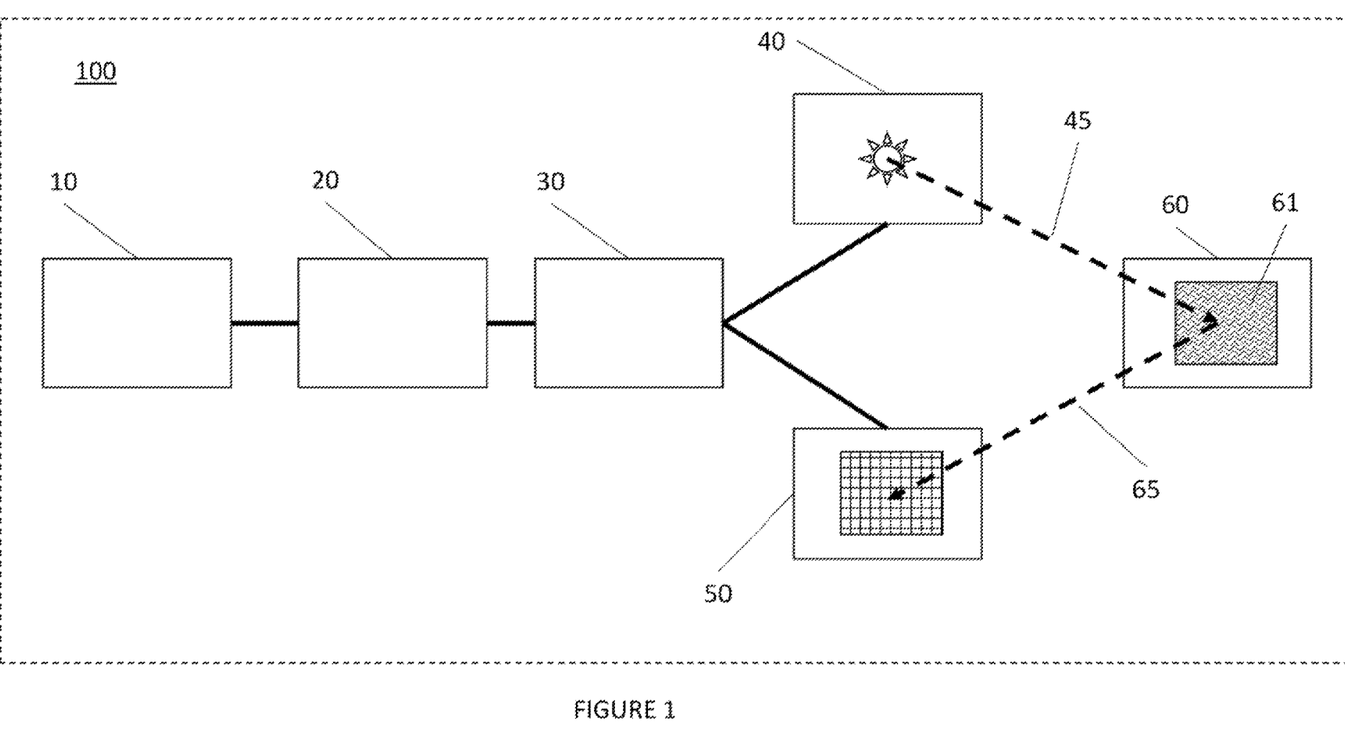
FIG. 1 is a block diagram of a passive colorimetric based sensor system.

FIG. 1 illustrates a colorimetric based sensor system 100. As illustrated in FIG. 1, the colorimetric based sensor system 100 includes an antenna 10 operatively connected to a microchip 20. Together, the antenna 10 and microchip 20 comprise a radio frequency identification device.

The microchip 20 is operatively connected to a controller 30. The controller 30 is operatively connected to a light emitter 40 and a light detector 50. The colorimetric based sensor system 100 also includes a colorimetric based sensor 60, which is in optical communication with the light emitter 40 and the light detector 50.

With respect to the colorimetric based sensor system 100 of FIG. 1, the antenna 10 harvests energy required for operation of the colorimetric based sensor system 100 from an interrogator (not shown) and retransmits data to the interrogator. The controller 30 routes the power harvested by the antenna 10 and/or control signals to the light emitter 40 and the light detector 50.

In response to the power harvested by the antenna 10 and/or control signals from the controller 30, the light emitter 40 produces light 45 having a predetermined color and/or intensity. The light 45 encounters the colorimetric based sensor 60, and light 65 is reflected back to the light detector 50. The light detector 50 converts the incident light 65 reflected from the colorimetric based sensor 60 and converts the light 65 to an electrical signal representing characteristics of the detected light 65, wherein the characteristics of the detected light 65 represent the state of a color patch 61 of the colorimetric based sensor 60.

The electrical signal is received and converted by controller 30 into data representing the characteristics of the detected light 65. The data is conveyed to the microchip 20, which in turn, causes the data to be transmitted through the antenna 10 to the interrogator (not shown).

As noted above, the colorimetric based sensor 60 includes color patch 61 that can modulate the incident light 45 so that the light detector 50 can detect the characteristics of the detected light 65 that represent the state of the color patch 61 of the colorimetric based sensor 60.

The colorimetric based sensor 60 also includes a sensor (not shown) that may detect environment conditions (such as temperature, pressure, presence of material, vibrations, orientation, etc.) surrounding or impacting the colorimetric based sensor 60. Based upon the sensed conditions, the sensor causes the color patch 61 to change to a color that represents the sensed condition.

For example, the color of the color patch 61 may change from blue to red when the associated sensor senses a temperature above a predetermined temperature.

It is noted that the light emitter 40 and the light detector 50 are arranged so that, when the light emitter 40 is activated, the emitted light 45 illuminates a color patch 61 of colorimetric based sensor 60. The color patch 61 includes indicator material whose color changes in response to the state of an environment or object being measured.

Figure 2:
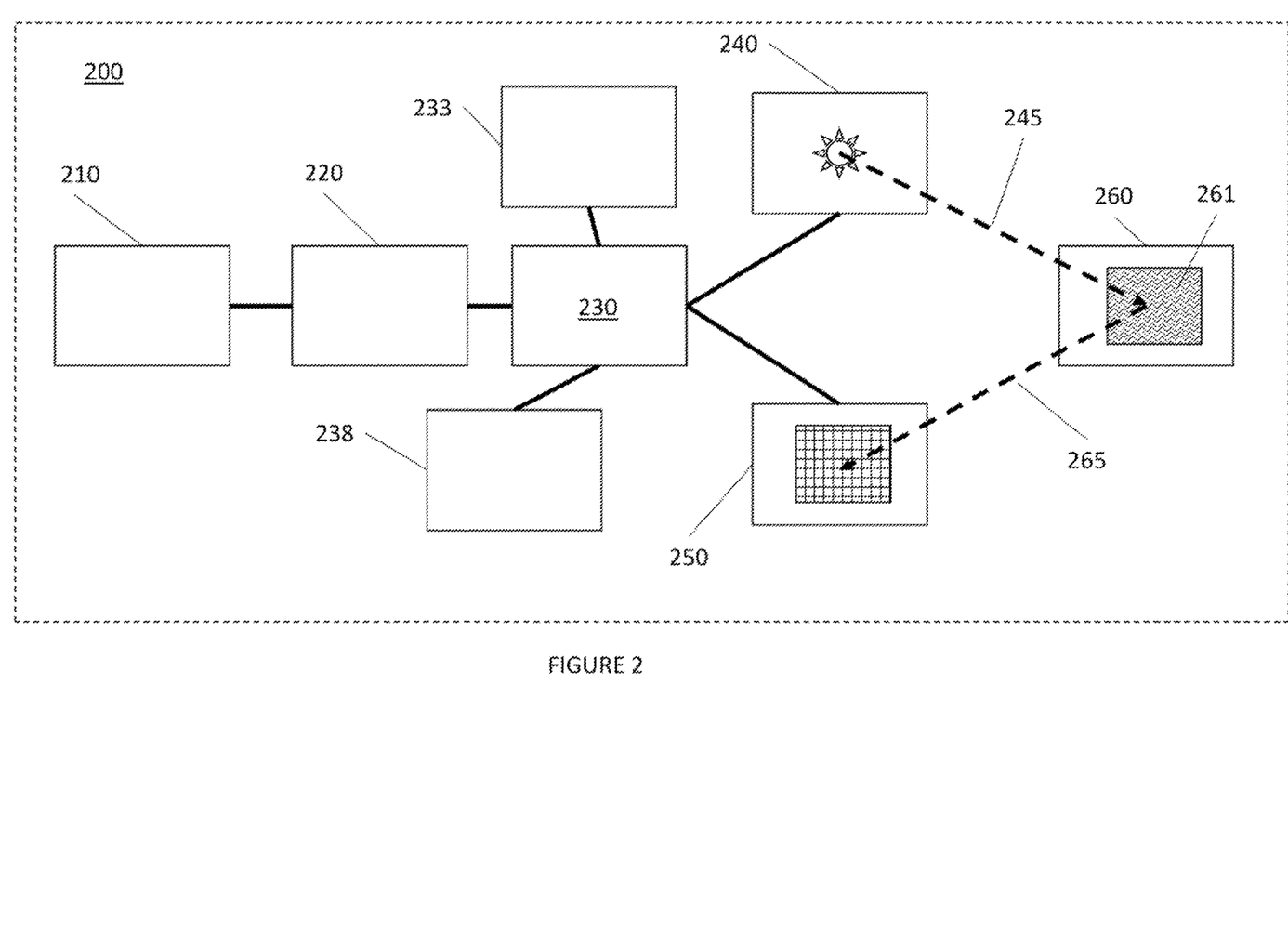
FIG. 2 is a block diagram of a semi-passive or active colorimetric based sensor system.

FIG. 2 illustrates a colorimetric based sensor system 200. As illustrated in FIG. 2, the colorimetric based sensor system 200 includes an antenna 210 operatively connected to a microchip 220. Together, the antenna 210 and microchip 210 comprise a radio frequency identification device.

The microchip 210 is operatively connected to a controller 230. The controller 230 is operatively connected to a light emitter 240 and a light detector 250. The colorimetric based sensor system 200 also includes a colorimetric based sensor 260, which is in optical communication with the light emitter 240 and the light detector 250.

The colorimetric based sensor system 200 includes an active power source 233 (such as a battery) and a memory 238, which are operatively connected to the controller 230. In one embodiment, the controller 230 controls the supply of power from the active power source 233 to the light emitter 240 and the light detector 250.

Alternatively, the active power source 233 may provide power directly to the light emitter 240 and the light detector 250, wherein the controller 230 provides control signals to the light emitter 240 and the light detector 250 to control the operations thereof.

The active power source 233 allows the colorimetric based sensor system 200 to continually monitor the colorimetric based sensor 260 even when the colorimetric based sensor system 200 is not being interrogated by an interrogator, by supplying to the controller 230 and/or the light emitter 240 and the light detector 250.

With respect to the colorimetric based sensor system 200 of FIG. 2, the antenna 210 receives an interrogation request for the colorimetric based sensor system 200 from an interrogator (not shown) and retransmits data to the interrogator. The controller 230, in response to the interrogation request received by the antenna 210, may retrieve collected data from the memory 238 and transfers this collected data to the microchip 220 for transmission through the antenna 210 to the interrogator.

In an alternative operation, the controller 230, in response to the interrogation request received by the antenna 210, may cause the light emitter 240 to produce light 245 having a predetermined color and/or intensity. The light 245 encounters the colorimetric based sensor 260, and light 265 is reflected back to the light detector 250. The light detector 250 converts the incident light 265 reflected from the colorimetric based sensor 260 and converts the light 265 to an electrical signal representing characteristics of the detected light 265, wherein the characteristics of the detected light 265 represent the state of a color patch 261 of the colorimetric based sensor 260.

The electrical signal is received and converted by controller 230 into data representing the characteristics of the detected light 265. The data is conveyed to the microchip 220, which in turn, causes the data to be transmitted through the antenna 210 to the interrogator (not shown).

As noted above, the colorimetric based sensor 260 includes color patch 261 that can modulate the incident light 245 so that the light detector 250 can detect the characteristics of the detected light 265 that represent the state of the color patch 261 of the colorimetric based sensor 260.

The colorimetric based sensor 260 also includes a sensor (not shown) that may detect environment conditions (such as temperature, pressure, presence of material, vibrations, orientation, etc.) surrounding or impacting the colorimetric based sensor 260. Based upon the sensed conditions, the sensor causes the color patch 261 to change to a color that represents the sensed condition.

For example, the color of the color patch 261 may change from blue to red when the associated sensor senses a temperature above a predetermined temperature.

It is noted that the light emitter 240 and the light detector 250 are arranged so that, when the light emitter 240 is activated, the emitted light 245 illuminates a color patch 261 of colorimetric based sensor 260. The color patch 261 includes indicator material whose color changes in response to the state of an environment or object being measured.

In another example, the colorimetric based sensor system may be used to detect the decay state of protein based foods. Decaying protein-based foods give off volatile amines. The colorimetric based sensor system would employ a colored patch of a pH indicator material, such as naturally occurring halochromic materials like anthocyanins.

In the various embodiments discussed above, the light emitter may be a light emitting diode.

Although the various the colorimetric based sensor system embodiments were described as utilizing a radio frequency identification device based system, the colorimetric based sensor system may employ an antenna and microchip combination to create a near field communication based colorimetric based sensor system or a Bluetooth™ low energy based colorimetric based sensor system. In other words, the antenna and the microchip compose a low power communication system that can receive signals and energy from an interrogator and broadcast data to the interrogator.

In the various embodiments discussed above, the light detector may be a photodetector, a photodiode, a phototransducer, phototransistor, or a light emitting diode.

In the various embodiments described above, the passive colorimetric based sensor provided environmental condition feedback based upon a discrete event. For example, in a temperature sensing situation, the passive colorimetric based sensor provides thermal feedback based upon a discrete event; i.e., temperature rising above a predetermined temperature.

However, there are circumstances where it is essential to know not only has the temperature risen above a predetermined temperature, but if the temperature has been above the predetermined temperature for a certain period of time. For example, if ice cream is above freezing for one second, the event does not matter; however, ice cream is above freezing for an hour, the event does matters.

Thus, in these circumstances, a "timed" passive colorimetric based sensor is desired.

A "timed" passive colorimetric based sensor can be realized in several ways. One way is to have the passive colorimetric sensor only change color after the passive colorimetric sensor has been at a temperature of interest for a certain period of time. Controlling the chemistry of such a timed passive colorimetric sensor to accomplish this result is difficult.

Figure 3:
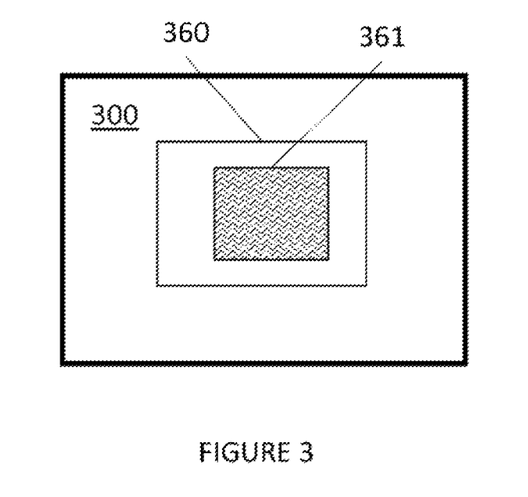
FIG. 3 illustrates a passive colorimetric based sensor positioned on a thermal mass to provide timed sensing.

In a different another approach, as illustrated in FIG. 3, a colorimetric sensor 360, with color patch 361, is attached to thermal material 300, such as a piece of metal, with known thermal conductivity or thermal characteristics. The combination of the colorimetric sensor 360, with color patch 361, and thermal material 300 create a timed passive colorimetric based sensor, as will be explained in more detail below.

The color patch 361 of the timed passive colorimetric based sensor of FIG. 3 will not change color until the thermal material 300 gets to a predetermined temperature. The amount of time it takes for the thermal material 300 to get to the predetermined temperature can be controlled by the mass of the thermal material 300, the thermal conductivity of the thermal material 300, or the material makeup of the thermal material 300.

Moreover, the amount of time it takes for the thermal material 300 to get to the predetermined temperature can be controlled by the placement of the thermal material 300 and the surroundings thereof. This results in a timed passive colorimetric based temperature sensor.

For example, if the function of the timed passive colorimetric based temperature sensor is to determine if the product in question has experienced a temperature over 0° C. for a period of 90 minutes, the thermal material 300 is configured (amount and/or material) such that the thermal material 300 will only reach a temperature of 1° C., when the thermal mass 300 has been exposed to a 1° C. environment for 90 minutes. When the thermal material 300 reaches 1° C. the color patch 361 of the colorimetric sensor 360 changes color to indicate that the product in question has experienced a temperature over 0° C. for a period of 90 minutes.

Figure 4:
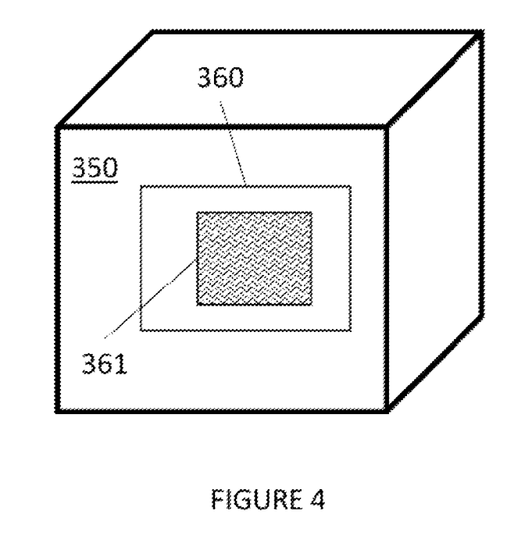
FIG. 4 illustrates a passive colorimetric based sensor encased in thermal conductive material to provide timed sensing.

In another embodiment, as illustrated in FIG. 4, a colorimetric sensor 360, with color patch 361, is covered or encased in a thermal material 350 with known thermal conductivity or thermal characteristics. The thermal properties of the thermal material 350; e.g., thickness, thermal conductivity, mass, etc.; can be tuned to affect the amount of time at a predetermined temperature before the color patch 361 of the colorimetric sensor 360 changes color.

For example, if the function of the timed passive colorimetric based temperature sensor is to determine if the product in question has experienced a temperature over 0° C. for a period of 90 minutes, the thermal material 350 is formed (thickness and thermal conductivity) such that the material 350 will only reach a temperature of 1° C., when the thermal material 350 has been exposed to a 1° C. environment for 90 minutes. When the thermal material 350 reaches 1° C. the color patch 361 of the colorimetric sensor 360 changes color to indicate that the product in question has experienced a temperature over 0° C. for a period of 90 minutes. In this embodiment, the thermal material 350 can be a clear material to enable a proper Interrogation (illumination) of the color patch 361.

In summary, a passive colorimetric based sensor system comprises a low power communication system to harvest energy from an interrogator and to broadcast information to the interrogator; a controller operatively connected to the low power communication system; a light emitter, operatively connected to the controller, to emit light; a light detector, operatively connected to the controller, to convert receive light into electrical signals; and a colorimetric based sensor, having a changeable color patch and in optical communication with the light detector and the light emitter, to measure a condition of an object of interest; the light emitter being positioned to emit light onto the changeable color patch of the colorimetric based sensor; the light detector being positioned to receive light reflected from the changeable color patch of the colorimetric based sensor the colorimetric based sensor causing the changeable color patch to change color based upon a measured condition of the object of interest; the light detector communicating the electrical signals converted from the received light to the controller; the controller, in response to the received electrical signals from the light detector, generating data representing a characteristic of the measured condition of the object of interest and causing the low power communication system to broadcast the generate data to the interrogator.

The low power communication system may include an antenna and a microchip.

The low power communication system may be a radio frequency identification device. The low power communication system may be a near field communication device. The low power communication system may be a Bluetooth™ low energy device.

The condition measured by the colorimetric based sensor may be temperature. The condition measured by the colorimetric based sensor may be relative humidity. The condition measured by the colorimetric based sensor may be pH. The condition measured by the colorimetric based sensor may be vibration. The condition measured by the colorimetric based sensor may be orientation. The condition measured by the colorimetric based sensor may be a specific chemical.

A changing of a color of the changeable color patch may be reversible. A changing of a color of the changeable color patch may be irreversible.

A non-passive colorimetric based sensor system comprises a low power communication system to receive an interrogation signal from an interrogator and to broadcast information to the interrogator; a controller operatively connected to the low power communication system; an active power source; a memory; a light emitter, operatively connected to the controller, to emit light; a light detector, operatively connected to the controller, to convert receive light into electrical signals; and a colorimetric based sensor, having a changeable color patch and in optical communication with the light detector and the light emitter, to measure a condition of an object of interest; the light emitter being positioned to emit light onto the changeable color patch of the colorimetric based sensor; the light detector being positioned to receive light reflected from the changeable color patch of the colorimetric based sensor the colorimetric based sensor causing the changeable color patch to change color based upon a measured condition of the object of interest; the light detector communicating the electrical signals converted from the received light to the controller; the controller, in response to the received electrical signals from the light detector, generating data representing a characteristic of the measured condition of the object of interest and storing the generated data in the memory; the controller, in response to an interrogation signal received by the low power communication system, transferring data from the memory to the low power communication system; the low power communication system broadcasting the transferred data to the interrogator.

The low power communication system may include an antenna and a microchip.

The low power communication system may be a radio frequency identification device. The low power communication system may be a near field communication device. The low power communication system may be a Bluetooth™ low energy device.

The condition measured by the colorimetric based sensor may be temperature. The condition measured by the colorimetric based sensor may be relative humidity. The condition measured by the colorimetric based sensor may be pH. The condition measured by the colorimetric based sensor may be vibration. The condition measured by the colorimetric based sensor may be orientation. The condition measured by the colorimetric based sensor may be a specific chemical.

A changing of a color of the changeable color patch may be reversible. A changing of a color of the changeable color patch may be irreversible.

A timed passive colorimetric based temperature sensor system comprises a low power communication system to harvest energy from an interrogator and to broadcast information to the interrogator; a controller operatively connected to the low power communication system; a light emitter, operatively connected to the controller, to emit light; a light detector, operatively connected to the controller, to convert receive light into electrical signals; a colorimetric based sensor, having a changeable color patch and in optical communication with the light detector and the light emitter, to measure a condition of an object of interest; and a thermal material, thermally connected to the colorimetric based sensor, having thermal characteristics such that the thermal material reaches a predetermined temperature after a predetermined period of time; the light emitter being positioned to emit light onto the changeable color patch of the colorimetric based sensor; the light detector being positioned to receive light reflected from the changeable color patch of the colorimetric based sensor the colorimetric based sensor causing the changeable color patch to change color when the thermal material reaches the predetermined temperature; the light detector communicating the electrical signals converted from the received light to the controller; the controller, in response to the received electrical signals from the light detector, generating data representing a characteristic of the measured condition of the object of interest and causing the low power communication system to broadcast the generate data to the interrogator.

The low power communication system may include an antenna and a microchip.

The low power communication system may be a radio frequency identification device. The low power communication system may be a near field communication device. The low power communication system may be a Bluetooth™ low energy device.

A changing of a color of the changeable color patch may be reversible. A changing of a color of the changeable color patch may be irreversible.

The colorimetric based sensor may be encased in the thermal material. The colorimetric based sensor may be located on the thermal material.

A timed non-passive colorimetric based temperature sensor system comprises a low power communication system to receive an interrogation signal from an interrogator and to broadcast information to the interrogator; a controller operatively connected to the low power communication system; an active power source; a memory; a light emitter, operatively connected to the controller, to emit light; a light detector, operatively connected to the controller, to convert receive light into electrical signals; a colorimetric based sensor, having a changeable color patch and in optical communication with the light detector and the light emitter, to measure a condition of an object of interest; and a thermal material, thermally connected to the colorimetric based sensor, having thermal characteristics such that the thermal material reaches a predetermined temperature after a predetermined period of time; the light emitter being positioned to emit light onto the changeable color patch of the colorimetric based sensor; the light detector being positioned to receive light reflected from the changeable color patch of the colorimetric based sensor the colorimetric based sensor causing the changeable color patch to change color when the thermal material reaches the predetermined temperature; the light detector communicating the electrical signals converted from the received light to the controller; the controller, in response to the received electrical signals from the light detector, generating data representing a characteristic of the measured condition of the object of interest and storing the generated data in the memory; the controller, in response to an interrogation signal received by the low power communication system, transferring data from the memory to the low power communication system; the low power communication system broadcasting the transferred data to the interrogator.

The low power communication system may include an antenna and a microchip.

The low power communication system may be a radio frequency identification device. The low power communication system may be a near field communication device. The low power communication system may be a Bluetooth™ low energy device.

A changing of a color of the changeable color patch may be reversible. A changing of a color of the changeable color patch may be irreversible.

The colorimetric based sensor may be encased in the thermal material. The colorimetric based sensor may be located on the thermal material.

A timed colorimetric based temperature sensor comprises a colorimetric based sensor, having a changeable color patch and in optical communication with the light detector and the light emitter, to measure a condition of an object of interest; and a thermal material, thermally connected to the colorimetric based sensor, having thermal characteristics such that the thermal mass reaches a predetermined temperature after a predetermined period of time; the colorimetric based sensor causing the changeable color patch to change color when the thermal mass has reached the predetermined temperature.

The colorimetric based sensor may be encased in the thermal material. The colorimetric based sensor may be located on the thermal material.

A changing of a color of the changeable color patch may be reversible. A changing of a color of the changeable color patch may be irreversible.

A colorimetric based sensor system comprising a low power communication system to receive an interrogation signal from an interrogator and to broadcast data to the interrogator; a controller operatively connected to the low power communication system; a light emitter, operatively connected to the controller, to emit light; a light detector, operatively connected to the controller, to convert receive light into electrical signals; and a colorimetric based sensor, having a changeable color patch and in optical communication with the light detector and the light emitter, to measure a condition of an object of interest; the light emitter being positioned to emit light onto the changeable color patch of the colorimetric based sensor; the light detector being positioned to receive light reflected from the changeable color patch of the colorimetric based sensor the colorimetric based sensor causing the changeable color patch to change color based upon a measured condition of the object of interest; the light detector communicating the electrical signals converted from the received light to the controller; the controller, in response to the received electrical signals from the light detector, generating data representing a characteristic of the measured condition of the object of interest; the controller, in response to the interrogation signal received by the low power communication system, causing the low power communication system to broadcast the generated data to the interrogator.

The low power communication system may include an antenna and a microchip.

The low power communication system may be a radio frequency identification device, a near field communication device, or a Bluetooth™ low energy device.

The condition measured by the colorimetric based sensor may be temperature, relative humidity, pH, vibration, orientation, or a specific chemical.

The a changing of a color of the changeable color patch may be reversible or irreversible.

The colorimetric based sensor system may include an active power source and a memory; wherein the controller, in response to the received electrical signals from the light detector, stories the generated data in the memory, and the controller, in response to the interrogation signal received by the low power communication system, transfers the generated data from the memory to the low power communication system and causes the low power communication system to broadcast the transferred data to the interrogator.

The colorimetric based sensor system may include a thermal material, thermally connected to the colorimetric based sensor, having thermal characteristics such that the thermal material reaches a predetermined temperature after a predetermined period of time; the colorimetric based sensor causing the changeable color patch to change color when the thermal material has reached the predetermined temperature.

The colorimetric based sensor may be encased in the thermal material or located on the thermal material.

The colorimetric based sensor system may include a thermal mass, thermally connected to the colorimetric based sensor, having thermal characteristics such that the thermal mass reaches a predetermined temperature after a predetermined period of time; the colorimetric based sensor causing the changeable color patch to change color when the thermal mass has reached the predetermined temperature.

The colorimetric based sensor may be encased in the thermal mass or located on the thermal mass.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. A colorimetric based sensor system comprising;
    a low power communication system to receive an interrogation signal from an interrogator and to broadcast data to the interrogator;
    a controller operatively connected to said low power communication system;

a light emitter, operatively connected to said controller, to emit light;
a light detector, operatively connected to said controller, to convert receive light into electrical signals; and
a colorimetric based sensor, having a changeable color patch and in optical communication with said light detector and said light emitter, to measure a condition of an object of interest;
said light emitter being positioned to emit light onto said changeable color patch of said colorimetric based sensor;
said light detector being positioned to receive light reflected from said changeable color patch of said colorimetric based sensor
said colorimetric based sensor causing said changeable color patch to change color based upon a measured condition of the object of interest, the measured condition of the object of interest being vibration;
said light detector communicating the electrical signals converted from the received light to said controller;
said controller, in response to the received electrical signals from said light detector, generating data representing a characteristic of the measured condition of the object of interest;
said controller, in response to the interrogation signal received by said low power communication system, causing said low power communication system to broadcast the generated data to the interrogator.

2. The colorimetric based sensor system as claimed in claim 1, wherein said low power communication system includes an antenna and a microchip.

3. The colorimetric based sensor system as claimed in claim 1, wherein said low power communication system is a radio frequency identification device.

4. The colorimetric based sensor system as claimed in claim 1, wherein said low power communication system is a near field communication device.

5. The colorimetric based sensor system as claimed in claim 1, wherein said low power communication system is a Bluetooth™ low energy device.

6. The colorimetric based sensor system as claimed in claim 1, wherein a changing of a color of said changeable color patch is reversible.

7. The colorimetric based sensor system as claimed in claim 1, wherein a changing of a color of said changeable color patch is irreversible.

8. The colorimetric based sensor system as claimed in claim 1, further comprising:
an active power source; and
a memory;
said controller, in response to the received electrical signals from said light detector, storing the generated data in said memory;
said controller, in response to the interrogation signal received by said low power communication system, transferring the generated data from said memory to said low power communication system and causing said low power communication system to broadcast the transferred data to the interrogator.

9. A colorimetric based sensor system comprising:
a low power communication system to receive an interrogation signal from an interrogator and to broadcast data to the interrogator;
a controller operatively connected to said low power communication system;
a light emitter, operatively connected to said controller, to emit light;
a light detector, operatively connected to said controller, to convert receive light into electrical signals;
a colorimetric based sensor, having a changeable color patch and in optical communication with said light detector and said light emitter, to measure a condition of an object of interest; and
a thermal material, thermally connected to said colorimetric based sensor, having thermal characteristics such that said thermal material reaches a predetermined temperature after a predetermined period of time;
said colorimetric based sensor causing said changeable color patch to change color when said thermal material has reached said predetermined temperature;
said light emitter being positioned to emit light onto said changeable color patch of said colorimetric based sensor;
said light detector being positioned to receive light reflected from said changeable color patch of said colorimetric based sensor said colorimetric based sensor causing said changeable color patch to change color based upon a measured condition of the object of interest;
said light detector communicating the electrical signals converted from the received light to said controller;
said controller, in response to the received electrical signals from said light detector, generating data representing a characteristic of the measured condition of the object of interest;
said controller, in response to the interrogation signal received by said low power communication system, causing said low power communication system to broadcast the generated data to the interrogator.

10. The colorimetric based sensor system as claimed in claim 9, wherein said colorimetric based sensor is encased in said thermal material.

11. The colorimetric based sensor system as claimed in claim 9, further comprising:
an active power source; and
a memory;
said controller, in response to the received electrical signals from said light detector, storing the generated data in said memory;
said controller, in response to the interrogation signal received by said low power communication system, transferring the generated data from said memory to said low power communication system and causing said low power communication system to broadcast the transferred data to the interrogator.

12. The colorimetric based sensor system as claimed in claim 9, wherein said low power communication system includes an antenna and a microchip.

13. The colorimetric based sensor system as claimed in claim 9, wherein said low power communication system is a radio frequency identification device.

14. The colorimetric based sensor system as claimed in claim 9, wherein said low power communication system is a near field communication device.

15. A colorimetric based sensor system comprising:
a low power communication system to receive an interrogation signal from an interrogator and to broadcast data to the interrogator;
a controller operatively connected to said low power communication system;
a light emitter, operatively connected to said controller, to emit light;
a light detector, operatively connected to said controller, to convert receive light into electrical signals;

a colorimetric based sensor, having a changeable color patch and in optical communication with said light detector and said light emitter, to measure a condition of an object of interest; and a thermal mass, thermally connected to said colorimetric based sensor, having thermal characteristics such that said thermal mass reaches a predetermined temperature after a predetermined period of time;

said colorimetric based sensor causing said changeable color patch to change color when said thermal mass has reached said predetermined temperature;

said light emitter being positioned to emit light onto said changeable color patch of said colorimetric based sensor;

said light detector being positioned to receive light reflected from said changeable color patch of said colorimetric based sensor said colorimetric based sensor causing said changeable color patch to change color based upon a measured condition of the object of interest;

said light detector communicating the electrical signals converted from the received light to said controller;

said controller, in response to the received electrical signals from said light detector, generating data representing a characteristic of the measured condition of the object of interest;

said controller, in response to the interrogation signal received by said low power communication system, causing said low power communication system to broadcast the generated data to the interrogator.

16. The colorimetric based sensor system as claimed in claim 15, wherein said colorimetric based sensor is encased in said thermal mass.

17. The colorimetric based sensor system as claimed in claim 15, further comprising:
an active power source; and
a memory;
said controller, in response to the received electrical signals from said light detector, storing the generated data in said memory;
said controller, in response to the interrogation signal received by said low power communication system, transferring the generated data from said memory to said low power communication system and causing said low power communication system to broadcast the transferred data to the interrogator.

18. The colorimetric based sensor system as claimed in claim 15, wherein said low power communication system includes an antenna and a microchip.

19. The colorimetric based sensor system as claimed in claim 15, wherein said low power communication system is a radio frequency identification device.

20. The colorimetric based sensor system as claimed in claim 15, wherein said low power communication system is a near field communication device.

* * * * *